US009613483B2

(12) United States Patent
Giobbi

(10) Patent No.: US 9,613,483 B2
(45) Date of Patent: Apr. 4, 2017

(54) PERSONAL DIGITAL KEY AND RECEIVER/DECODER CIRCUIT SYSTEM AND METHOD

(75) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 857 days.

(21) Appl. No.: 11/292,330

(22) Filed: Nov. 30, 2005

(65) Prior Publication Data
US 2006/0136742 A1 Jun. 22, 2006

Related U.S. Application Data

(63) Continuation-in-part of application No. 09/750,487, filed on Dec. 27, 2000, now abandoned, and a (Continued)

(51) Int. Cl.
*H04L 29/06* (2006.01)
*G07F 7/10* (2006.01)
(Continued)

(52) U.S. Cl.
CPC ........... *G07F 7/1008* (2013.01); *G06Q 20/12* (2013.01); *G06Q 20/346* (2013.01); *G07C 9/00111* (2013.01)

(58) Field of Classification Search
None
See application file for complete search history.

(56) References Cited

U.S. PATENT DOCUMENTS

| 4,759,060 A | 7/1988 | Hayashi et al. |
| 4,993,068 A | 2/1991 | Piosenka et al. |

(Continued)

FOREIGN PATENT DOCUMENTS

| WO | WO 00/62505 A1 | 10/2000 |
| WO | WO 01/22724 A1 | 3/2001 |

(Continued)

OTHER PUBLICATIONS

"What is a File?", Apr. 30, 1998, URL: http://unixhelp.ed.ac.uk/editors/whatisafile.html, accessed Mar. 11, 2010 via http://waybackmachine.org/19980615000000*/http://unixhelp.ed.ac.uk/editors/whatisafile.html.*

(Continued)

*Primary Examiner* — Jeffery Williams
(74) *Attorney, Agent, or Firm* — Patent Law Works LLP

(57) ABSTRACT

The present invention enables automatic authentication of a personal digital key based upon proximity of the key which is associated with a person. The system enables linking of the personal digital key to an account based upon the automatic authentication. The personal digital key includes encrypted digital data unique thereto, which enables automatic authentication based upon proximity thereof to a receiver and the account linking system. The system further includes an account linking system based upon automatic authentication of the personal digital key. The account linking system comprises a receiver/decoder circuit, which is able to automatically authenticate the personal digital key, whereby the personal digital key is able to be linked to and associated with an account.

51 Claims, 8 Drawing Sheets

Related U.S. Application Data continuation-in-part of application No. 10/016,857, filed on Dec. 14, 2001, now abandoned, and a continuation-in-part of application No. 10/153,979, filed on May 23, 2002, now Pat. No. 7,472,280, and a continuation-in-part of application No. 10/715,035, filed on Nov. 17, 2003, now Pat. No. 6,973,576, and a continuation-in-part of application No. 10/847,135, filed on May 17, 2004, now Pat. No. 7,305,560.

(60) Provisional application No. 60/632,067, filed on Dec. 1, 2004, provisional application No. 60/652,765, filed on Feb. 14, 2005.

(51) Int. Cl.
*G06Q 20/12* (2012.01)
*G06Q 20/34* (2012.01)
*G07C 9/00* (2006.01)

(56) References Cited

U.S. PATENT DOCUMENTS

| | | |
|---|---|---|
| 5,187,352 A | 2/1993 | Blair et al. |
| 5,296,641 A | 3/1994 | Stelzel |
| 5,392,433 A | 2/1995 | Hammersley et al. |
| 5,416,780 A | 5/1995 | Patel |
| 5,422,632 A | 6/1995 | Bucholtz et al. |
| 5,450,489 A | 9/1995 | Ostrover et al. |
| 5,619,251 A | 4/1997 | Kuroiwa et al. |
| 5,623,552 A | 4/1997 | Lane |
| 5,629,980 A | 5/1997 | Stefik et al. |
| 5,644,354 A | 7/1997 | Thompson et al. |
| 5,666,412 A | 9/1997 | Handelman et al. |
| 5,784,464 A | 7/1998 | Akiyama et al. |
| 5,825,876 A | 10/1998 | Peterson, Jr. |
| 5,857,020 A | 1/1999 | Peterson, Jr. |
| 5,892,825 A | 4/1999 | Mages et al. |
| 5,894,551 A | 4/1999 | Huggins et al. |
| 5,898,880 A | 4/1999 | Ryu |
| 5,917,913 A | 6/1999 | Wang |
| 5,928,327 A | 7/1999 | Wang et al. |
| 5,991,399 A | 11/1999 | Graunke et al. |
| 5,991,749 A | 11/1999 | Morrill, Jr. |
| 6,016,476 A | 1/2000 | Maes et al. |
| 6,018,739 A | 1/2000 | McCoy et al. |
| 6,025,780 A | 2/2000 | Bowers |
| 6,035,038 A | 3/2000 | Campinos et al. |
| 6,035,329 A | 3/2000 | Mages et al. |
| 6,038,334 A | 3/2000 | Hamid |
| 6,041,410 A | 3/2000 | Hsu et al. |
| 6,042,006 A * | 3/2000 | Van Tilburg et al. ...... 235/382.5 |
| 6,055,314 A | 4/2000 | Spies et al. |
| 6,070,796 A | 6/2000 | Sirbu |
| 6,088,730 A | 7/2000 | Kato et al. |
| 6,104,334 A | 8/2000 | Allport |
| 6,121,544 A | 9/2000 | Petsinger |
| 6,148,142 A | 11/2000 | Anderson |
| 6,161,179 A | 12/2000 | Seidel |
| 6,185,316 B1 * | 2/2001 | Buffam ........................ 382/115 |
| 6,209,089 B1 | 3/2001 | Selitrennikoff et al. |
| 6,219,109 B1 | 4/2001 | Raynesford et al. |
| 6,219,439 B1 * | 4/2001 | Burger ........................ 382/115 |
| 6,237,848 B1 | 5/2001 | Everett |
| 6,247,130 B1 | 6/2001 | Fritsch |
| 6,256,737 B1 | 7/2001 | Bianco et al. |
| 6,266,415 B1 | 7/2001 | Campinos et al. |
| 6,295,057 B1 | 9/2001 | Rosin et al. |
| 6,325,285 B1 | 12/2001 | Baratelli |
| 6,336,121 B1 | 1/2002 | Lyson et al. |
| 6,336,142 B1 | 1/2002 | Kato et al. |
| 6,363,485 B1 * | 3/2002 | Adams et al. ................. 713/186 |
| 6,367,019 B1 | 4/2002 | Ansell et al. |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,715 B1 | 7/2002 | Saito |
| 6,425,084 B1 | 7/2002 | Rallis et al. |
| 6,434,535 B1 | 8/2002 | Kupka et al. |
| 6,446,130 B1 | 9/2002 | Grapes |
| 6,463,534 B1 | 10/2002 | Geiger et al. |
| 6,480,188 B1 | 11/2002 | Horsley |
| 6,490,443 B1 | 12/2002 | Freeny, Jr. |
| 6,510,350 B1 | 1/2003 | Steen et al. |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,805 B1 | 5/2003 | Ma et al. |
| 6,564,380 B1 | 5/2003 | Murphy |
| 6,628,302 B2 | 9/2003 | White et al. |
| 6,632,992 B2 | 10/2003 | Hasegawa |
| 6,645,077 B2 * | 11/2003 | Rowe .............................. 463/42 |
| 6,647,417 B1 | 11/2003 | Hunter et al. |
| 6,657,538 B1 | 12/2003 | Ritter |
| 6,667,684 B1 | 12/2003 | Waggamon et al. |
| 6,683,954 B1 | 1/2004 | Searle |
| 6,697,944 B1 | 2/2004 | Jones et al. |
| 6,709,333 B1 * | 3/2004 | Bradford et al. ............... 463/29 |
| 6,711,464 B1 | 3/2004 | Yap et al. |
| 6,728,397 B2 | 4/2004 | McNeal |
| 6,775,655 B1 | 8/2004 | Peinado et al. |
| 6,804,825 B1 | 10/2004 | White et al. |
| 6,806,887 B2 | 10/2004 | Chernock et al. |
| 6,850,147 B2 | 2/2005 | Prokoski et al. |
| 6,853,988 B1 | 2/2005 | Dickinson |
| 6,873,975 B1 | 3/2005 | Hatakeyama et al. |
| 6,879,966 B1 | 4/2005 | Lapsley et al. |
| 6,950,941 B1 | 9/2005 | Lee et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,983,882 B2 * | 1/2006 | Cassone ........................ 235/382 |
| 7,012,503 B2 | 3/2006 | Nielsen |
| 7,090,126 B2 | 8/2006 | Kelly et al. |
| 7,112,138 B2 * | 9/2006 | Hedrick et al. ................. 463/29 |
| 7,137,008 B1 | 11/2006 | Hamid |
| 7,137,012 B1 * | 11/2006 | Kamibayashi et al. ....... 713/193 |
| 7,155,416 B2 | 12/2006 | Shatford |
| 7,168,089 B2 * | 1/2007 | Nguyen et al. .................... 726/4 |
| 7,191,466 B1 | 3/2007 | Hamid et al. |
| 7,218,944 B2 | 5/2007 | Cromer et al. |
| 7,231,068 B2 | 6/2007 | Tibor |
| 7,249,177 B1 | 7/2007 | Miller |
| 7,278,025 B2 | 10/2007 | Saito |
| 7,305,560 B2 | 12/2007 | Giobbi |
| 7,314,164 B2 | 1/2008 | Bonalle |
| 7,341,181 B2 | 3/2008 | Bonalle |
| 7,349,557 B2 | 3/2008 | Tibor |
| 7,424,134 B2 | 9/2008 | Chou |
| 7,529,944 B2 | 5/2009 | Hamid |
| 7,565,329 B2 | 7/2009 | Lapsley et al. |
| 7,574,734 B2 | 8/2009 | Fedronic et al. |
| 7,587,611 B2 * | 9/2009 | Johnson et al. ............... 713/186 |
| 7,617,523 B2 | 11/2009 | Das et al. |
| 7,644,443 B2 | 1/2010 | Matsuyama et al. |
| 7,715,593 B1 * | 5/2010 | Adams et al. ................. 382/115 |
| 7,883,417 B2 * | 2/2011 | Bruzzese et al. ................. 463/39 |
| 8,484,696 B2 * | 7/2013 | Gatto et al. ........................ 726/2 |
| 8,678,273 B2 | 3/2014 | McNeal |
| 8,979,646 B2 * | 3/2015 | Moser et al. .................... 463/29 |
| 2001/0026619 A1 | 10/2001 | Howard, Jr. et al. |
| 2001/0044337 A1 * | 11/2001 | Rowe et al. ..................... 463/29 |
| 2002/0007456 A1 | 1/2002 | Peinado et al. |
| 2002/0013772 A1 | 1/2002 | Peinado |
| 2002/0014954 A1 * | 2/2002 | Fitzgibbon et al. ......... 340/5.64 |
| 2002/0015494 A1 | 2/2002 | Nagai et al. |
| 2002/0023032 A1 | 2/2002 | Pearson |
| 2002/0026424 A1 | 2/2002 | Akashi |
| 2002/0056043 A1 | 5/2002 | Glass |
| 2002/0071559 A1 | 6/2002 | Christensen et al. |

(56) References Cited

U.S. PATENT DOCUMENTS

| | | |
|---|---|---|
| 2002/0073042 A1 | 6/2002 | Maritzen et al. |
| 2002/0091646 A1* | 7/2002 | Lake .................. G06Q 20/04 705/67 |
| 2002/0098888 A1* | 7/2002 | Rowe et al. .................. 463/39 |
| 2002/0103027 A1* | 8/2002 | Rowe et al. .................. 463/39 |
| 2002/0104006 A1 | 8/2002 | Boate et al. |
| 2002/0104019 A1 | 8/2002 | Chatani |
| 2002/0108049 A1 | 8/2002 | Xu et al. |
| 2002/0109580 A1 | 8/2002 | Shreve et al. |
| 2002/0116615 A1* | 8/2002 | Nguyen .................. H04L 67/38 713/168 |
| 2002/1010804 | 8/2002 | Xu et al. |
| 2002/0129262 A1 | 9/2002 | Kutaragi et al. |
| 2002/0138767 A1 | 9/2002 | Hamid et al. |
| 2002/0140542 A1* | 10/2002 | Prokoski et al. ............ 340/5.52 |
| 2002/0144117 A1 | 10/2002 | Faigle |
| 2002/0150282 A1* | 10/2002 | Kinsella .................. 382/124 |
| 2002/0152391 A1 | 10/2002 | Willins et al. |
| 2002/0158750 A1* | 10/2002 | Almalik .................. 340/5.83 |
| 2002/0174348 A1 | 11/2002 | Ting |
| 2002/0178063 A1* | 11/2002 | Gravelle et al. .................. 705/17 |
| 2002/0191816 A1 | 12/2002 | Maritzen et al. |
| 2003/0036425 A1* | 2/2003 | Kaminkow et al. ............ 463/25 |
| 2003/0046552 A1 | 3/2003 | Hamid |
| 2003/0054868 A1* | 3/2003 | Paulsen et al. .................. 463/1 |
| 2003/0054881 A1* | 3/2003 | Hedrick et al. .................. 463/29 |
| 2003/0055689 A1 | 3/2003 | Block et al. |
| 2003/0079133 A1 | 4/2003 | Breiter et al. |
| 2003/0115474 A1 | 6/2003 | Khan et al. |
| 2003/0127511 A1 | 7/2003 | Kelly et al. |
| 2003/0139190 A1 | 7/2003 | Steelberg et al. |
| 2003/0149744 A1 | 8/2003 | Bierre et al. |
| 2003/0172037 A1 | 9/2003 | Jung et al. |
| 2003/0176218 A1* | 9/2003 | LeMay et al. .................. 463/25 |
| 2003/0186739 A1* | 10/2003 | Paulsen et al. .................. 463/25 |
| 2004/0098597 A1 | 5/2004 | Giobbi |
| 2004/0123127 A1 | 6/2004 | Teicher et al. |
| 2004/0127277 A1* | 7/2004 | Walker et al. .................. 463/16 |
| 2004/0128162 A1 | 7/2004 | Schlotterbeck et al. |
| 2004/0129787 A1* | 7/2004 | Saito et al. .................. 235/492 |
| 2004/0209690 A1* | 10/2004 | Bruzzese et al. .................. 463/39 |
| 2004/0209692 A1* | 10/2004 | Schober et al. .................. 463/42 |
| 2004/0215615 A1 | 10/2004 | Larsson et al. |
| 2004/0230488 A1 | 11/2004 | Beenau et al. |
| 2005/0001028 A1 | 1/2005 | Zuili |
| 2005/0006452 A1 | 1/2005 | Aupperle |
| 2005/0054431 A1* | 3/2005 | Walker .................. G06Q 50/34 463/25 |
| 2005/0074126 A1 | 4/2005 | Stanko |
| 2005/0081040 A1* | 4/2005 | Johnson et al. .............. 713/176 |
| 2005/0105734 A1 | 5/2005 | Buer |
| 2005/0109836 A1 | 5/2005 | Ben-Aissa |
| 2005/0229007 A1 | 10/2005 | Bolle et al. |
| 2005/0251688 A1 | 11/2005 | Nanavati et al. |
| 2005/0253683 A1* | 11/2005 | Lowe .................. 340/5.53 |
| 2006/0022046 A1 | 2/2006 | Iwamura |
| 2006/0058102 A1* | 3/2006 | Nguyen .............. G07F 17/3223 463/39 |
| 2006/0063575 A1* | 3/2006 | Gatto .................. A63F 13/00 463/1 |
| 2006/0076401 A1* | 4/2006 | Frerking .............. G06K 7/0008 235/380 |
| 2006/0113381 A1* | 6/2006 | Hochstein et al. .......... 235/382 |
| 2006/0156027 A1* | 7/2006 | Blake .................. 713/186 |
| 2007/0032288 A1* | 2/2007 | Nelson .................. G07F 17/323 463/16 |
| 2007/0060319 A1* | 3/2007 | Block .................. G07F 17/3223 463/27 |
| 2007/0084523 A1 | 4/2007 | McLean |
| 2007/0087834 A1* | 4/2007 | Moser et al. .................. 463/42 |
| 2007/0159301 A1 | 7/2007 | Hirt et al. |
| 2007/0213048 A1 | 9/2007 | Trauberg |
| 2007/0219926 A1 | 9/2007 | Korn |
| 2007/0220272 A1 | 9/2007 | Campisi et al. |
| 2008/0008359 A1 | 1/2008 | Beenau et al. |
| 2008/0019578 A1* | 1/2008 | Saito et al. .................. 382/124 |
| 2008/0188308 A1* | 8/2008 | Shepherd et al. .............. 463/39 |
| 2009/0328182 A1* | 12/2009 | Malakapalli et al. .......... 726/11 |
| 2010/0117794 A1* | 5/2010 | Adams et al. .............. 340/5.83 |
| 2011/0126188 A1 | 5/2011 | Bernstein et al. |
| 2012/0226907 A1* | 9/2012 | Hohberger .............. B41J 17/36 713/168 |
| 2013/0019295 A1 | 1/2013 | Park |
| 2013/0111543 A1 | 5/2013 | Brown |
| 2013/0276140 A1 | 10/2013 | Coffing |
| 2013/0331063 A1 | 12/2013 | Cormier |

FOREIGN PATENT DOCUMENTS

| | | |
|---|---|---|
| WO | WO 01/75876 A1 | 10/2001 |
| WO | WO 01/77790 A1 | 10/2001 |
| WO | WO 2005/050450 A1 | 6/2005 |
| WO | WO 2005/086802 A2 | 9/2005 |

OTHER PUBLICATIONS

Simon Liu and Mark Silverman. 2001. "A Practical Guide to Biometric Security Technology". IT Professional 3, (Jan. 1, 2001), 27-32. DOI=10.1109/6294.899930 http://dx.doi.org/10.1109/6294.899930.*

Smart Card Alliance Report, "Contactless Technology for Secure Physical Access: Technology and Standards Choices", Smart Card Alliance, Oct. 2002, p. 1-48.*

Vainio, Juha., "Bluetooth Security", 2000, Helskinki University of Technology, p. 1-20.*

"Alliance Activities: Publications: Identity—Smart Card Alliance," Smart Card Alliance, 1997-2007, [online] [Retrieved on Jan. 7, 2007] Retrieved from the Internet<URL:http://www.smartcardalliance.orgipages/publications-identity>.

"Applying Biometrics to Door Access," Security Magazine, Sep. 26, 2002 [online] [Retrieved on Jan. 7, 2007] Retrieved from the Internet<URL:http://www.securitymagazine.com/CDA/Articles/Technologi es/3ae610eaa34d8010VgnVCM100000f932a8c0_>.

"Frequently Asked Questions (FAQs) About BioPay," BioPay, LLC, 2007, [online] [Retrieved on Jan. 7, 2007] Retrieved from the Internet<URL:http://www.biopay.com/faqs-lowes.asp>.

McIver, R. et al., "Identification and Verification Working Together," Bioscrypt™, Aug. 27, 2004, [online] [Retrieved on Jan. 7, 2007] Retrieved from the Internet<URL:http://www.ibia.org/membersadmin/whitepapers/pdf/15/Identification%20and %20Verification%20Working%20Together.pdf>.

Nilsson, J. et al., "Match-On-Card for Java Cards," Precise Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card %20for%20Java%20Cards.pdf>.

Nordin, B., "Match-On-Card Technology," Precise™ Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card %20technology.pdf>.

"SAFModule™: A Look Into Strong Authentication," saflink Corporation, [online] [Retrieved on Jan. 7, 2007] Retrieved from the Internet<URL:http://www.ibia.org/membersadmin/whitepapers/pdf/6/SAFmod_WP.pdf>.

"Smart Cards and Biometrics White Paper," Smart Card Alliance, May 2002, [online] [Retrieved on Jan. 7, 2007] Retrieved from the Internet<URL:http://www.securitymanagement.com/library/smartcar_faqtech0802.pdf>.

Wade, W., "Using Fingerprints to Make Payments at POS Slowly Gaining Popularity," Credit Union Journal, International Biometric Group, Apr. 21, 2003, [online] [Retrieved on Jan. 7, 2007] Retrieved from the Internet<URL:http://www.biometricgroup.com/in_the_news/04.21.03.html>.

Antonoff, Michael, "Visiting Video Valley," Sound & Vision, pp. 116 and 118-119, Nov. 2001.

(56) References Cited

OTHER PUBLICATIONS

Article, "In the Age of Napster, Pretecting Copyright is a Digital Arm & Race," WallStreet Journal, Jul. 25, 2000.
Article, "Sound Waves Could Help Ease Web-Fraud Woes," Wall Street Journal, Aug. 14, 2000.
Blum, Jonathan, "Digital Rights Management May Solver the Napster "Problem"," Technology Investor Industrysector, (Oct. 2000), 24-27.
Debow, Credit/Debit Debuts in Midwest Smart Card Test, Computers in Banking, v6, n11, p. 10, Nov. 1989.
Dennis, Digital Passports Need Not Infringe Civil Liberties, Newsbytes, Dec. 2, 1999, 2 pages.
Fasca, Chad, "The Circuit," Electronic News, 45(45) (Nov. 8, 1999), 20.
Firecrest Shows How Truly Commercially-Minded Companies Will Exploit the Internet, Computergram International, Jan. 18, 1996.
Lake, Matt, "Downloading for Dollars," Sound & Vision, (Nov. 2000), 137-138.
Notification of the International Search Report and Written Opinion, PCT/US04/38124, Apr. 7, 2005, 10 pages.
Paget, Paul, "The Security Behind Secure Extranets," Enterprise Systems Journal, (Dec. 1999), 4 pgs.
Press Release, "Micronas and Thomson Multimedia Showcase a New Copy Protection System that Will Drive the Future of Digital Television," www.micronas.com, Jan. 8, 2002.
Press Release, "Content Protection Plan Targets Wireless Home Networks," www.eetimes.com Jan. 11, 2002.
Press Release, "Thompson Bets on Smart Cards for Video Encryption," www.informationweek.com Jun. 7, 2001.
Press Release, "Thompson Multimedia Unveils Copy Protection Proposal Designed to Provide Additional Layer of Digital Content Security," www.thompson-multimedia.com, May 30, 2001.
"Say Hello to Bluetooth," Bluetooth Web site, 4 pages.
Sapsford, Jathon, "E-Business: Sound Waves Could Help Ease Web-Fraud Woes," Wall Street Journal, (Aug. 14, 2000), B1.
Van Winkle, William, "Bluetooth, the King of Connectivity," Laptop Buyers Guide and Handbook, (Jan. 2000), 148-153.
Wallace, Bob, "The Internet Unplugged," InformationWeek, 765(22), (Dec. 13, 1999), 22-24.
Weber, Thomas E., "In the Age of Napster, Protecting Copyright is a Digital Arms Race," Wall Street Journal, (Jul. 24, 2000), B1.
PCT International Search Report and Written Opinion, PCT/US07/11103, Apr. 23, 2008, 9 pages.
PCT International Search Report and Written Opinion, PCT/US05/43447, Feb. 22, 2007, 7 pages.
PCT International Search Report and Written Opinion, PCT/US05/46843, Mar. 1, 2007, 10 pages.
PCT International Search Report and Written Opinion, PCT/US07/11105, Oct. 20, 2008, 10 pages.
United States Office Action, U.S. Appl. No. 11/745,249, Oct. 5, 2009, 11 pages.
United States Office Action, U.S. Appl. No. 11/314,199, Nov. 22, 2010, 23 pages.
United States Office Action, U.S. Appl. No. 11/744,831, Sep. 3, 2010, 27 pages.
International Search Report, PCT/US07/11104, Jun. 26, 2008, 9 pages.
International Search Report, PCT/US07/11102, Oct. 3, 2008, 11 pages.
United States Office Action, U.S. Appl. No. 11/314,199, Oct. 5, 2011, 22 pages.
United States Office Action, U.S. Appl. No. 11/744,831, Dec. 16, 2011, 38 pages.
Pope, Oasis Digital Signature Services: Digital Signing without the Headaches, Internet Computing—IEEE, vol. 10, 2006, pp. 81-84.
Farouk, "Authentication Mechanisms in Grid Computing Environment; Comparative Study", 2012, IEEE, p. 1-6.
United States Office Action, U.S. Appl. No. 11/745,249, Feb. 2, 2012, 36 pages.
United States Office Action, U.S. Appl. No. 11/744,832, Feb. 7, 2012, 32 pages.
Katz et al., "Smart Cards and Biometrics in Privacy-Sensitive Secure Personal Identification System", dated 2002, Smart Card Alliance, p. 1-29.

* cited by examiner

PERSONAL DIGITAL KEY AND RECEIVER/DECODER CIRCUIT SYSTEM AND METHOD

CROSS-REFERENCE TO RELATED APPLICATIONS

This application is a continuation-in-part of the following: application Ser. No. 09/750,487, filed on Dec. 27, 2000 now abandoned; application Ser. No. 10/016,857, filed on Dec. 14, 2001 now abandoned; application Ser. No. 10/153,979, filed on May 23, 2002 now abandoned; application Ser. No. 10/715,035, filed on Nov. 17, 2003 now U.S. Pat. No. 6,973,576; and application Ser. No. 10/847,135, filed on May 17, 2004 now U.S. Pat. No. 7,305,560, and this application is claiming the benefit of provisional Application Ser. No. 60/632,067, filed on Dec. 1, 2004, and provisional Application Ser. No. 60/652,765, filed on Feb. 14, 2005.

The following are incorporated herein by reference: United States Patent Application Publication No. US 2002/0080969, published on Jun. 27, 2002, entitled "Digital Rights Management System and Method"; United States Patent Application Publication No. US 2003/0115351, published on Jun. 19, 2003, entitled "Digital Content Distribution System and Method"; United States Patent Application Publication No. US 2002/0144116, published on Oct. 3, 2002, entitled "Digital Rights Management"; United States Patent Application Publication No. US 2004/0098597, published on May 20, 2004, entitled "Digital Content Security System"; and United States Patent Application Publication No. US 2004/0255139, published on Dec. 16, 2004 entitled "Digital Content Security System". The following is incorporated by reference as an Appendix herein: PCT Patent Application, serial no. PCT/US2005/007535, filed on Mar. 8, 2005, entitled "Linked Account System Using Personal Digital Key".

BACKGROUND OF THE INVENTION

Casinos and hotels consider enhancing overall customer experience to be critical for running their businesses, including tracking customer spending/play habits (in their shops and restaurants, and on the casino's games), administering customer loyalty programs, and managing the hotel's services including guest room door locks, parking garage uses, and room charge functions. To help accomplish these goals, among many other technologies, procedures and systems, hotels typically utilize electronic tracking systems including credit cards, guest room cards, and card reader systems, and most casinos utilize electronic tracking systems typically referred to as Player Tracking Systems (PTSs).

A casino's PTS captures customer game play and spending information, offering customers the ability to earn points based on their level of play/spending, and casinos the ability to institute customer/player Rewards Programs (RPs). The captured data can also be utilized for many other purposes including: developing marketing promotions, producing reports analyzing usage flow and trends, customer history/preferences/habits. Casinos and customers/players both benefit from PTSs and consider the systems valuable.

In order for a customer to begin earning points they must first join a casino's RP. To do this, the customer typically provides to the casino basic contact and preference information which is used to establish a customer/player account. Once established, the customer is given a unique player tracking card (PTC) which they can utilize whenever playing games, making purchases within the casino, to earn points. Earned points (stored in their account) can later be redeemed for items such as room upgrades, free dinners or game play. PTCs are typically just simple plastic cards containing magnetic strips (nearly identical in design to common credit cards).

Some systems even allow customers/players to deposit cash into their accounts—much like a bank account—and debit/credit the balance as part of ongoing game play. This capability, usually referred to as Electronic Funds Transfer (EFT), allows players to play slot machines for example without requiring them to continually insert cash before placing bets, or physically collect any coins paid out from winnings, and generally makes the process of moving from game-to-game more convenient and efficient. Casino's benefit from EFT in a number of ways as well.

Additionally, PTSs make it possible to collect player preference information (e.g. specific games or game types, average bet data) and use it to tailor players' experiences. This capability becomes particularly valuable with the anticipated emergence of downloadable games (where games can be dynamically loaded from a centralized game server onto individual gaming machines as needed). In this environment, a customized set of games, for example, could automatically be offered to a player based on the player's historical preference.

Using the tracking of an individual's slot machine play to illustrate, the player inserts the player's PTC into a card reader (typically located on the front face of the machine) prior to beginning game play. This action, in effect, "logs" the player into the PTS. Then during game-play, relevant data is captured and stored on a centralized data-server (and the player's account in particular) typically located in a casino's backroom operations area. When the player has finished play on a particular machine, by removing the PTC, the player indicates to the PTS that the player wishes to be "logged-off".

By giving individuals PTCs to use, the process of identifying them to a PTS is simplified (much like when individuals use bank cards at an ATM). Once inserted into a card reader, information is read from a PTC and transmitted back to the centralized server where the player's account and other logging databases are accessed, updated, as needed. For example, typical data captured/stored in a game log history might include the title, bet information, number of plays, and outcome for each game played.

Player tracking is usually implemented in slot machines via a separate hardware/software component often referred to as the player tracking hardware. This component generally includes a simple computer board, a card reader, some type of display means, and various ports allowing for electronic interface to the backend system's network (a computerized network on which any participating gaming devices and the centralized databases reside), as well as to local gaming device electronics.

In addition to its use with slot machines, a PTS often utilizes other options for accepting PTC information. At a table game, for example, this may be a simple keyboard at which the individual managing the table (usually the dealer) can enter a player's card data. For a shop within a casino, it may be a small device located at the checkout counter that can read PTCs. All of the given devices, however, are designed to accomplish one primary task—to capture, and make available to the casino, a customer's habits (game-play, store/restaurant spending, etc.).

There are a number of inherent problems with current PTSs, however. One is their reliance on customers/players to use their PTCs. A PTS is worthless if customers/players do not use their PTCs. And even when they do use them, certain types of information still are not captured when using today's technology (e.g. how many customers stopped to look at a game but chose not to play it). And finally, because the effort to physically retrieve a card (from a purse or wallet), insert it into a machine, and then importantly, remember to remove it when finished, all represent some level of hassle to many customers/players, there is often a reluctance to use PTCs in many situations.

Therefore, the ability to replace PTCs with a more user-friendly and powerful alternative could significantly benefit both customers/players and casinos. And the ability to utilize this alternative technology for services far beyond simple player tracking would be more valuable yet.

INVENTION SUMMARY

This Invention utilizes the primary components in Personal Digital Key (PDK) technology, comprising a secure wireless Key (Key) and Receiver/Decoder Circuit (RDC).

The Invention effectively replaces casino PTS' and hotel card reader components with RDCs, and casino PTCs and hotel cards with Keys. So anywhere a card reader is currently utilized—in slot machines, table games, casino and hotel shops and restaurants—an RDC takes its place, and every customer/player involved in a casino's RP and in a hotel's services carries a Key, each unique, in place of their current PTC.

In the casino environment defined above, a player could for example simply walk up to a slot machine and have the machine automatically recognize (via PDK's wireless Key recognition and identification capabilities) and offer them a customized experience. Some examples of such an experience might include: having the machine "welcome" them, suggest a favorite game (or a menu of their favorite games), and perhaps present a promotion geared toward their known likings. These benefits are all in addition to the one underlying benefit that these players no longer need to remember to insert or remove their PTCs in order to participate in the casino's RP (to earn coveted points).

The Invention's wireless recognition and identification capabilities, however, also enable many other valuable benefits and capabilities. Some examples include the ability to track the number of individuals who stopped to look at a new game but chose not to play it (potentially valuable for assessing why a newly placed game is not earning as anticipated), and having a slot machine personally identify and offer customized promotions to customers/players when approached.

The Invention can be configured so as to allow an individual to utilize only a single Key to connect with any PTS (at any casino), or to require them to use a separate Key for each casino (or casino chain's) PTS. For branding/promotional purposes, depending on the setup, casinos could include logos or other icons on their Keys.

Additional capabilities can be utilized to protect customer account records and other database and transaction information. By encrypting a customer account's data, and making it accessible only when the linked Key(s) is detected, the Invention can substantially improve data integrity in environments utilizing EFT, for example.

From an operations standpoint, casinos can utilize the Invention's ability to (when authorized) create separate "master" Keys enabling capabilities such as more efficient game/machine/systems management. An example might include enabling authorized representatives to modify machine setup/configuration data without requiring the devices to be physically opened As an individual approaches such a machine it could simply prompt them for a password to confirm their authorization, and then allow the needed changes to be performed via an externally-based software interface. The machine could also automatically log the individual's ID and any changes performed, for audit purposes.

Another important set of benefits the Invention provides relate to the inherent cost savings that are a result of its underlying technology/design. RDCs are by their very design, smaller, less expensive, and less prone to maintenance problems than the card readers they replace. So, in addition to recouping valuable front-panel "real-estate" on most gaming devices (because RDCs are smaller and do not need to be located where they can be directly accessed by players), the Invention lowers per-unit costs, build/assembly times, and ongoing maintenance expenses.

In summary, replacing casino PTS' and hotel card readers and casino PTCs and hotel cards with the Invention's Keys and RDCs enables cost savings and capabilities far beyond those possible with current technologies. The inherent ability to automatically recognize individuals based on their proximity to a gaming machine (or any other RDC-based option), then utilize that capability to "push" or "pull" data to/from the individuals enables a wide-ranging set of powerful new capabilities benefiting customers/players, casino marketing analysis and promotional departments, and even casino operations personnel.

Property-wide solutions can also be assembled, by including RDCs in ancillary stand-alone or otherwise-networked devices, whereby the Invention can provide core building blocks enabling the seamless, consistent, property-wide integration of many operations. These operations, inherent to most casinos and casino-chains, may include: the ability to track and find customers and employees, hotel check-in/check-out, restaurant/store transaction management, hotel room-key management, and parking-garage management. Once accepted as a PTS replacement, these ancillary capabilities can be progressively introduced, significantly enhancing a casino's overall operations efficiency, as well as its customer's overall experience.

The Invention's ability to give customers a single Key that enables them to, among other things, effortlessly check-in/check-out from the hotel, direct all charges to one account, participate in the casino's RP, open their hotel room door, and automatically recall their car from a parking garage, and enables the property to track that customer's spending and game-play history, automatically recognize and authenticate them for marketing and promotional purposes, as finally, to simplify its own internal operations, represents a set of features and capabilities not possible using any other current technology.

The Invention enables automatic authentication of a personal digital key based upon proximity of the personal digital key. The personal digital key is associated with a person. The system enables linking of the personal digital key to an account based upon the automatic authentication. The personal digital key includes encrypted digital data unique thereto. It enables automatic authentication based upon proximity thereof to an account linking system. The system further includes an account linking system based upon automatic authentication of the personal digital key. The account linking system comprises a receiver/decoder circuit. The recorder/decoder circuit is able to automatically authenticate the personal digital key, whereby the personal digital key is able to be linked to and associated with an account.

These and other objects, aspects and advantages of the invention will become apparent from the following detailed description and the accompanying drawings, which illustrate by way of example the features of the invention.

DESCRIPTION OF THE PREFERRED EMBODIMENTS

Figure 1:
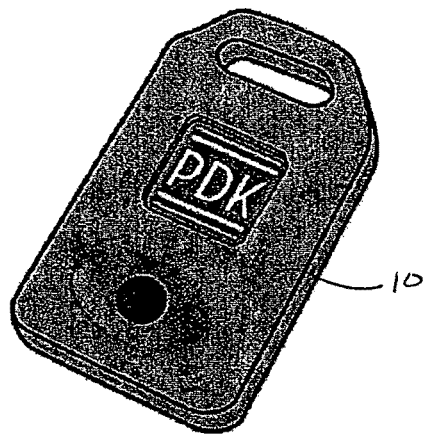
FIG. 1 is an illustration of a first version of a wireless personal digital key, in accordance with the present invention.

Referring to the drawings, the system according to the invention enables automatic authentication of a personal digital key based upon proximity of the personal digital key, wherein the personal digital key is able to be associated with a person, and enables linking of the personal digital key to an account based upon the automatic authentication. The system includes a personal digital key, able to be associated with a person, which includes encrypted digital data unique thereto, and which enables automatic authentication based upon proximity thereof to an account linking system. It also includes an account linking system based upon automatic authentication of the personal digital key, which account linking system comprises a receiver/decoder circuit, which is able to automatically authenticate the personal digital key upon proximity of the personal digital key to the receiver/decoder circuit, and whereby the personal digital key is able to be linked to and associated with an account.

The personal digital key and the receiver/decoder circuit are able to authenticate each other. The linked account is unlocked upon the personal digital key being located in proximity and authenticated to the receiver/decoder circuit, and the linked account is locked upon the personal digital key being located outs of proximity to the receiver/decoder circuit. The personal digital key includes an internal power source. The range of the personal digital key, for proximity to the receiver/decoder circuit to enable account linking, is adjustable as desired. The range, on average, is typically about six to eight feet, but can extend up to about three-hundred feet and beyond. The personal digital key includes a permanent, secure, unique identifier, that can never be modified, updated, or manipulated in any way. It transmits the unique encrypted digital data to the receiver/decoder circuit through a secure wireless link.

The unique encrypted digital data in the personal digital key includes an unchangeable unique personal digital key identifier. The receiver/decoder circuit includes an unchangeable unique identifier. The receiver/decoder circuit is able to detect, authenticate, and securely communicate with the personal digital key. The receiver/decoder circuit is able to detect, authenticate, and securely communicate with multiple personal digital keys in parallel. The receiver/decoder circuit is further able to encrypt and decrypt content, such as data, documents, e-mail, transactions, games, and music. The linked account includes data therein, and the receiver/decoder circuit is able to directly or indirectly access the data in the linked account based upon automatic authentication of the personal digital key. The personal digital key and the reader/decoder circuit includes embedded challenge-response logic and cryptographic algorithms, for enabling secure authentication of the personal digital key and the receiver/decoder circuit as original, not copied, authorized devices, and for enabling secure ongoing communications between the authentic devices.

The system is able to provide one or more customized services for the linked account. The customized service provided for the linked account may comprise customized services for a casino property and/or a hotel property. The casino property customized service may comprise tracking the number of personal digital keys which are in proximity to a receiver/decoder circuit. The casino property can also include a slot machine or the like, and the casino property customized service may include games which are able to be downloaded to the slot machine, wherein the slot machine includes the receiver/decoder circuit, the system is able to track customer preferences regarding games, and, based upon the games preferences, and through the receiver/decoder unchangeable unique identifier, the system is able to decrypt games delivered to the slot machine from the system's download server, ensuring that a downloaded game has arrived unaltered from that of the download server's "master" version.

The system can further protect any and all transaction data flowing across the system's network, between slot machines and their associated reader/decoder circuits (or any other device utilizing a recorder/decoder circuit) and the system's various servers. In this function, the system utilizes the reader/decoder circuits located in each communicating devices to encrypt/decrypt the transaction data.

The system may further include a game server which includes games which the game server is able to encrypt. The receiver/decoder circuit in the slot machine is able to accept games from the game server which have been encrypted with the reader/decoder circuit's unique identifier as the encryption key, and the receiver/decoder circuit is able to decrypt such games for play on the slot machine.

As clearly observed in the drawings, the system according to the invention includes a Personal Digital Key (PDK) proximity-based technology, where small, individually-unique devices, comprising personal digital keys (Keys), are wirelessly authenticated by a secondary device, which comprises a Reader/Decoder Circuit (RDCs). RDCs act as gatekeepers to a wide variety of digital and physical items, optionally granting valid Keys access to the items.

The system's core capabilities include secure digital access, secure access and use of digital content, devices and transactions, secure physical access, secure access and use of physical entities and devices, and Key and Owner recognition and authentication. Many products are designed around these capabilities, which products include Keys, RDCs/Chipsets, and/or, Hard Drives, Access Systems, and Account Protection Systems. The system may be utilized in gaming (e.g. casino) and non-gaming products.

Figure 2:
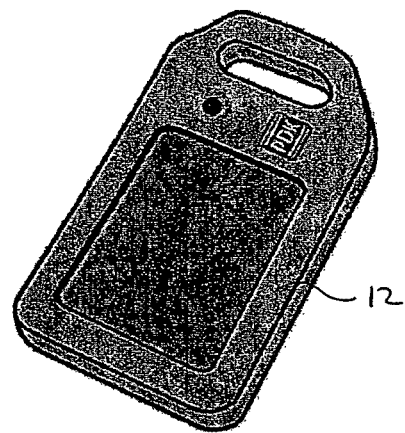
FIG. 2 is an illustration of a second version of a wireless personal digital key, in accordance with the present invention.
Figure 3:
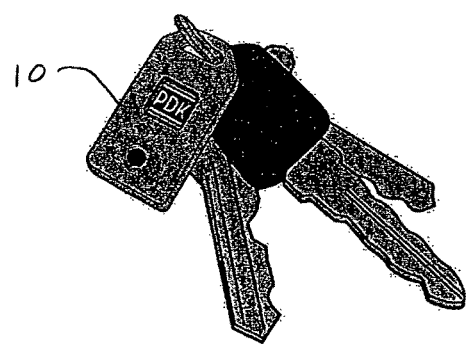
FIG. 3 includes illustrations of several forms of wireless personal digital keys, in the present invention.
Figure 3:
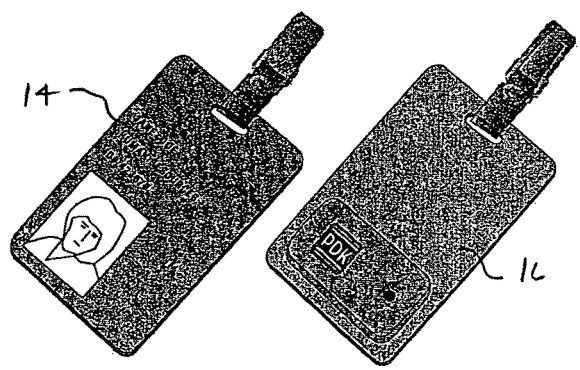
Figure 4:
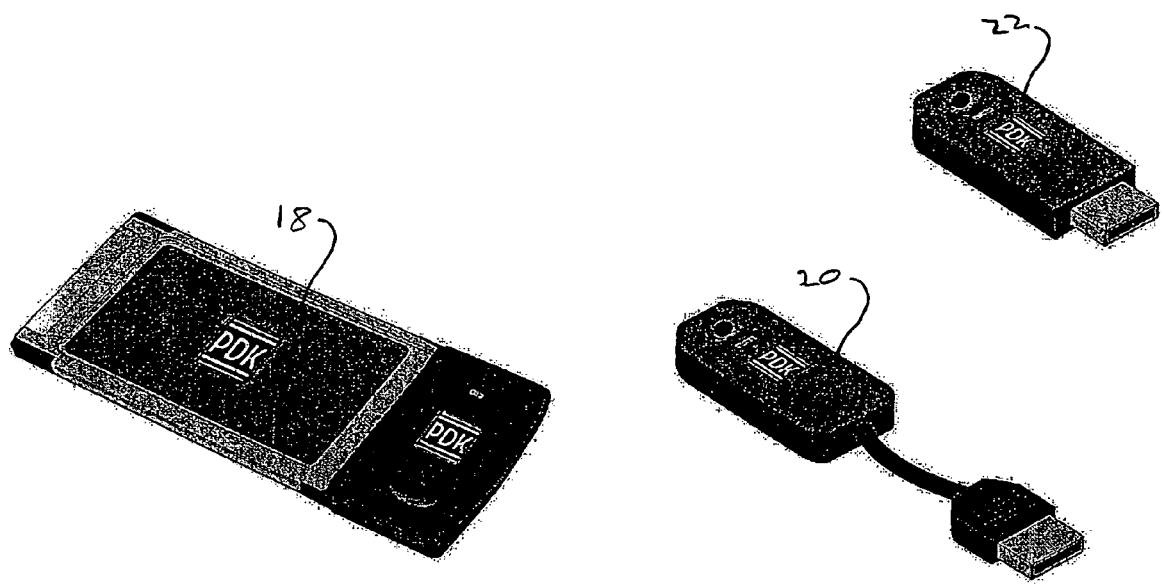
FIG. 4 includes illustrations of several versions of receiver/decoder circuit adapters, in the present invention.

In the system, as illustrated in FIGS. 1-3, several forms of Keys are shown, including Keys 10, 12, 14, and 16, which keys are single-unit, self-contained devices, which may be shaped similar to automobile-style key fobs. Every Key produced is uniquely identifiable. Keys incorporate and utilize complex, active-technology, two-way, secure, wireless authentication and encrypted communications algorithms. Keys are not able to be modified, updated, or changed in any way once manufactured, making them substantially impervious to tampering and hacking.

The Key, in a standard proximity-only version, utilizes a standard Key, which involves simply carrying it. Regardless of the number of uses, individuals never require more than one Key. Plastic or similar Key housings (the casing surrounding a Key's internal components and electronics) can be formed and shaped into many varying designs. This capability enables customized branding, acceptable and suitable for use in single and multiple-property environments, where the properties are not necessarily all part of the same business entity. This allows customers and players to utilize and carry only a single Key, regardless of how many businesses, properties, and systems they wish to interact with. One example of such an option includes forming Keys in the shape of miniature slot machines, where a slide-in compartment accepts small branded "signs" containing the names of casino properties. An individual sign could be slid in or out of the housing as needed, and multiple signs could, for example, simultaneously be attached, along with the Key itself, to a typical key ring. The Key provides branding options acceptable to property owners, which enable customers and players to utilize and carry only a single Key.

A Bio Key 12, as shown in FIG. 2, is an enhanced proximity and biometric version. It utilizes an enhanced Bio Key, which, for example, may involve placing a finger on the Key's pad, running an eye-scan, or taking any biometric action, enabling it to biometrically authenticate its owner. In all other respects, Bio Keys are identical to standard Keys. In particular, the Bio Key 12 works like the Key 10, with the difference that the Key 10 transmits its identification code when it is asked to, whereas the Bio Key 12 will not do so unless the biometric action is taken, so that it authenticates the person, whereupon the identification code is transmitted.

The system is a proximity-based technology, and RDC adapters 18, 20, 22 and 24, referring to FIGS. 4, 6, 7, and 9, can detect, authenticate and communicate with Keys when they are in-range, and they know when they are not detected in-range. Specific protected items include a digital file, which can be associated ("linked") with individual Keys. The system technology utilizes elements and features such as Key and Receiver/Decoder Circuit components, active (two-way authentications/communications) proximity-based technology, and the ability to automatically detect, read and authenticate Keys (every Key is unique). It also utilizes the ability to conduct secure communications over its wireless Key-to-RDC link, and the ability to optionally employ secondary authentication processes (such as requesting passwords for confirmations or taking a biometric action) when desired.

Figure 5:
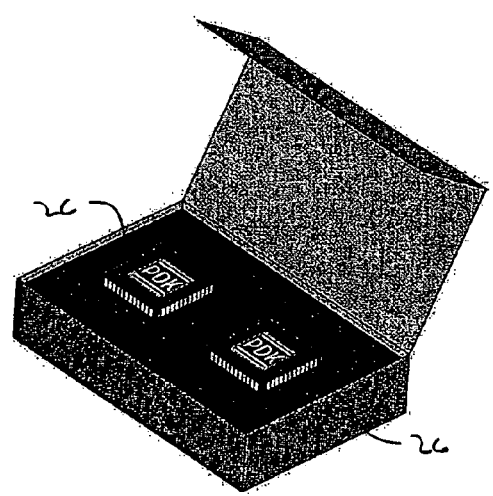
FIG. 5 is an illustration of receiver/decoder circuit chipsets, in accordance with the present invention.
Figure 6:
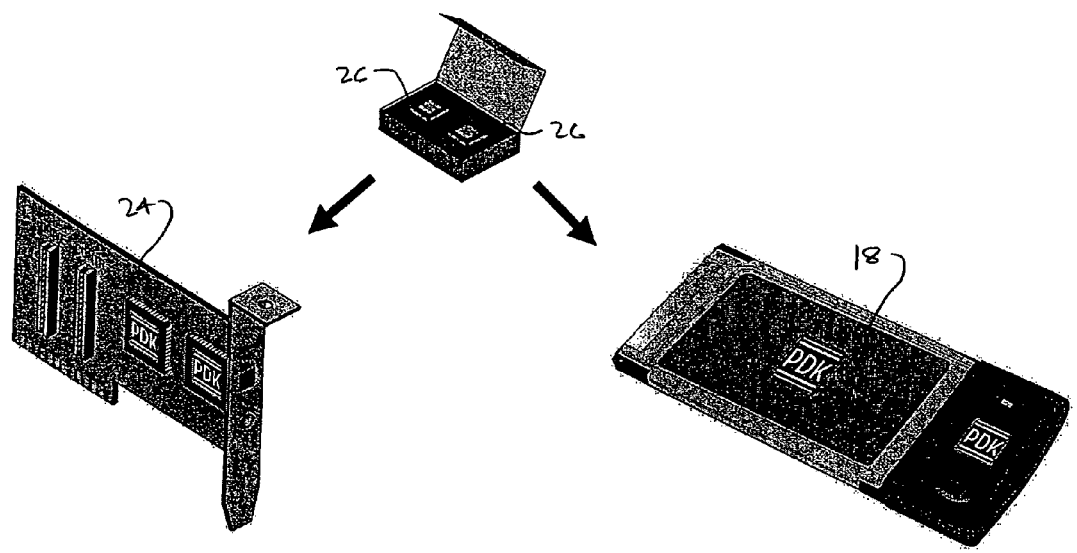
FIG. 6 is an illustration of receiver/decoder circuit chipsets and several versions of receiver/decoder circuit adapters, in the present invention.
Figure 7:
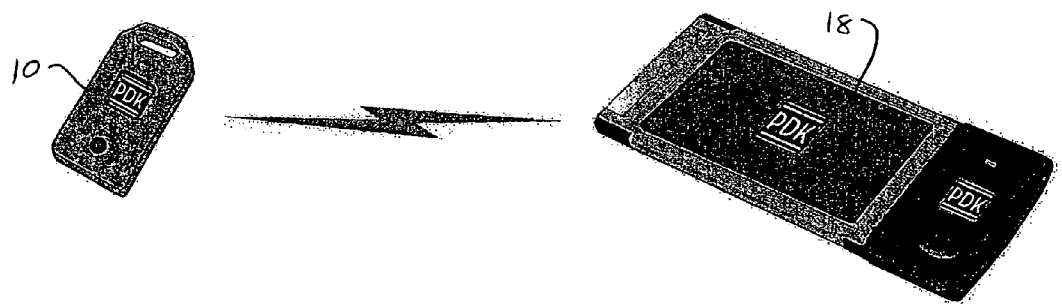
FIG. 7 is an illustration of a personal digital key and a receiver/decoder circuit adapter in the present invention.

PDK Reader/Decoder Circuit chipsets 26 (RDC chipsets), as seen in FIGS. 5-6, incorporate core capabilities which include authentication, cryptography, and access control. Reader/Decoder Circuit adapters (RDCs) utilize standardized chipsets. RDC options enable the PDK technology to be added to nearly any legacy and modern computer, as well as most other electronic devices. PDK's standardized chipsets power all RDC adapters, and integrate directly into OEM products enabling full, on-board PDK compliancy. External RDC options connect via PC Card and USB ports, creating upgrade paths for legacy and modern computers, which include standard hard drives, except for the addition of integrated RDCs. Access to the drives and their content is allowed only when linked Keys are detected, protecting them if lost, stolen, or simply left unattended.

Figure 8:
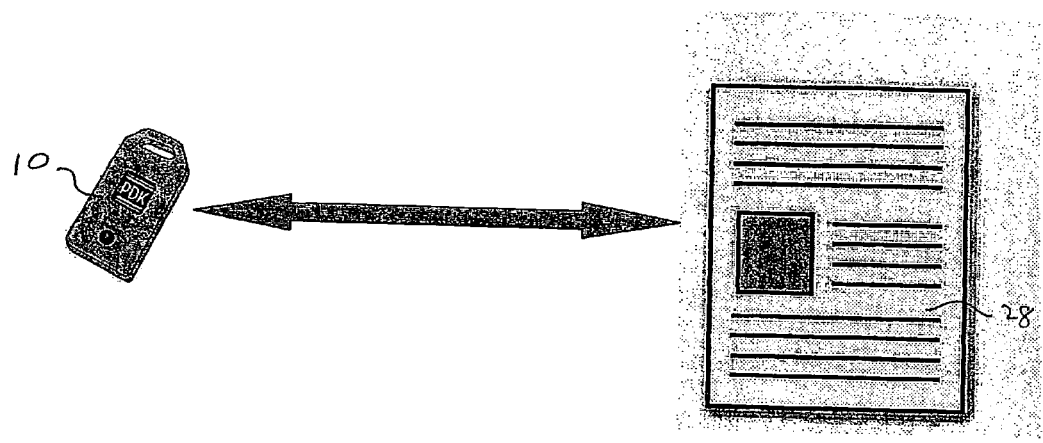
FIG. 8 is an illustration of a personal digital key and a linked account, in the present invention.
Figure 9:
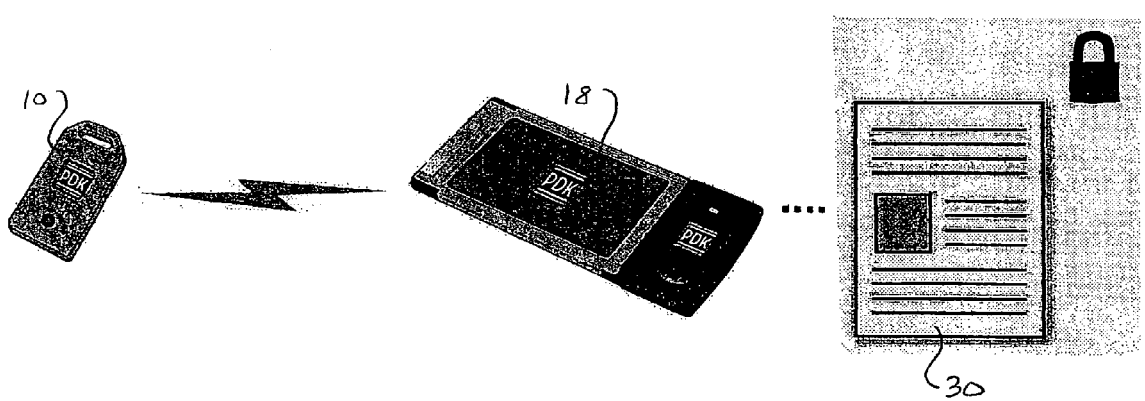
FIG. 9 is an illustration of a personal digital key, a receiver/decoder circuit adapter, and a secured linked account, in the present invention.
Figure 10:
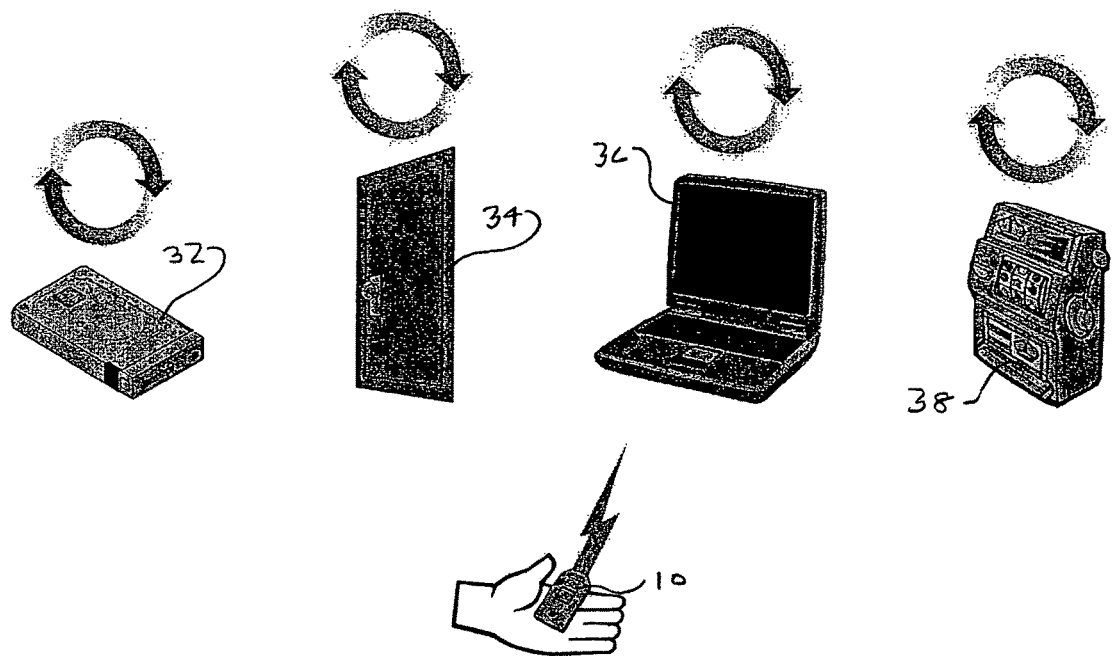
FIG. 10 is an illustration of a version of a personal digital key and multiple devices which can be linked thereto, in accordance with the present invention.

Once an account is linked, whenever access is attempted, an RDC scans for the items (as file 28, secured file 30, and through drive 32, door 34, computer 36, and slot machine 38, for example, in FIGS. 8-10) linked to the Key. If detected, access is allowed—if not, access is denied, and the item remains locked and secured. Because Keys can be linked to as many protected items as needed, at any time, users never need to carry more than a single small Key, and similarly, standardized RDCs simplify upgrade and integration efforts.

Figure 11:
FIG. 11 is an illustration of a person with an associated personal digital key enabling a customized service of operating a secured computer through a linked account, in the present invention.
Figure 13:
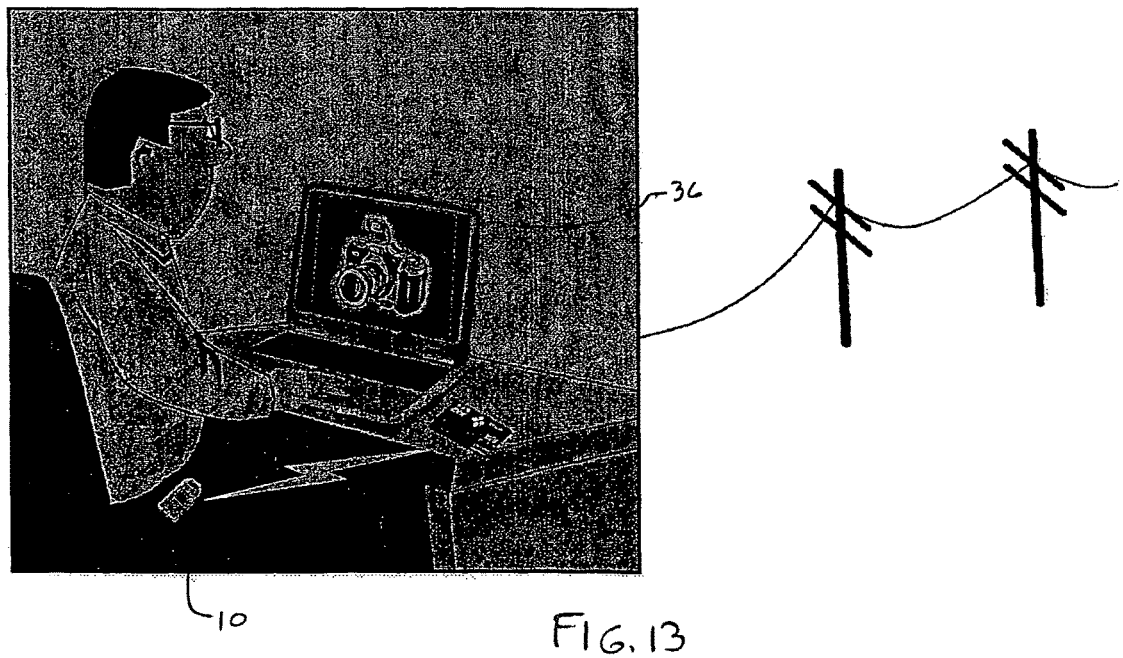
FIG. 13 is an illustration of a person with an associated personal digital key enabling a customized service of ordering a camera online through a linked account, in the present invention.

For example, with a person at his desk, and his Key detected, as in FIG. 11, his computer 36 functions exactly as any other PC. But when he moves away, and his Key is no longer detected, his drive is automatically locked and secured. Similarly, when the person approaches a PDK-enhanced ATM, he simply touches his finger to his Bio Key, the ATM automatically recognizes who he is (and his account number), and effectively uses his fingerprint as his PIN. It provides enhanced authentication of account-based transactions—significantly reducing opportunities for credit/bank card fraud, by linking an account holder's Key to his or her account. Once linked, transactions against the accounts are allowed only when linked Keys are detected. In an example, as seen in FIG. 13, when attempting to purchase a new Camera, a person makes his selection, and enters his credit card number. His key is automatically read, and his order, card and Key information is sent to the store.

Figure 12:
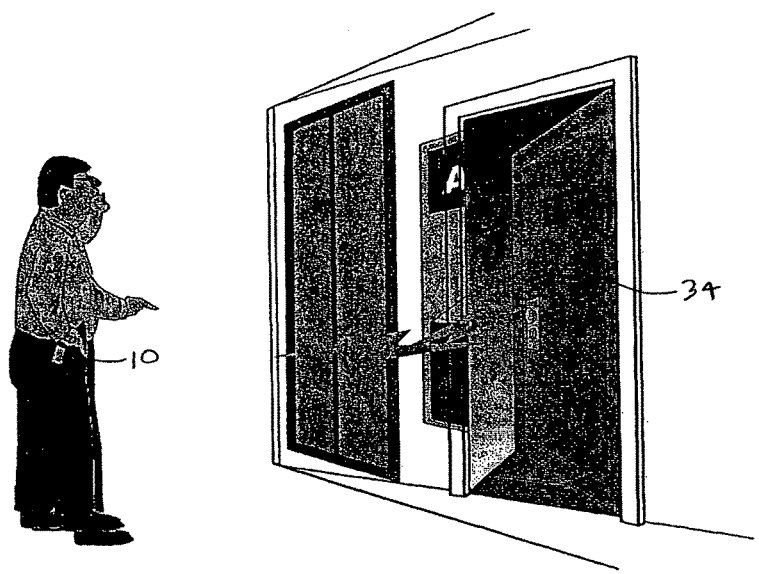
FIG. 12 is an illustration of a person with an associated personal digital key enabling a customized service of opening a secured door through a linked account, in the present invention.

As illustrated in FIG. 12, the following "access" examples illustrate basic capabilities and uses enabled by core capabilities. Utilizing both the standard and/or biometrically-enhanced Keys, many similar OEM and stand-alone products and uses are envisioned. Core recognition and authentication capabilities can be integrated into many common devices with relative ease. Hands-free, password free, contact key free, and very close placement key free technology enables limitless new possibilities for handling traditionally inefficient and/or inconvenient tasks. Various Key types and styles provide the means to tailor the technology's security capabilities to nearly any need.

The system's RDCs wirelessly detect, authenticate, and securely communicate with Keys. RDCs may include the ability to interrogate Keys in a particular region and section (e.g. a room or section of a property), and to identify specific Key information, (e.g. quantities of Keys in an area), to identify "hot spots". It also includes the ability for high traffic areas and general customer distribution about a property, or to locate a specific Key(s). RDCs can simultaneously detect multiple Keys in a vicinity (e.g. detecting all individuals surrounding a particular game).

The system's gaming products include casino property systems, for example for a casino or a Casino/Hotel, which include standard and biometrically-enhanced versions. The technology in casino and hotel environments enables Keys to replace or work in conjunction with currently-standard Player Tracking Cards (PTC). Each Key is linked to an account record(s) located in a centralized database(s), where customer and player account information is maintained, and may also replace or work with cash and/or room-charge account numbers (Electronic Fund Transfer or EFT) where appropriate (within the establishment). Key usage may be configured as one per individual, one per casino, one per casino chain, or combinations of each depending on needs. RDCs may function as stand-alone units, and replace or work in conjunction with current Player Tracking System (PTS) card readers and other common devices such as cash registers, credit card swipe machines, door locking mechanisms, kiosks, and PCs.

When the system is installed in other than electronic gaming machines, RDCs may be connected to the needed network(s) and centralized database(s) via devices such as small stand-alone units with or without touch-screens or display mechanisms, integrated into other devices such as kiosks, PCs, cash registers, door locking mechanisms, portable readers (as may be used in parking lot garages or walk-up bars). Such connections may be via independent hardware connected directly to PTS network (bypassing all local-device hardware), or via independent hardware connected to independent network running parallel to PTS network (where the networks are optionally connected elsewhere). Connections for any of above options may be wired or wireless.

Figure 14:
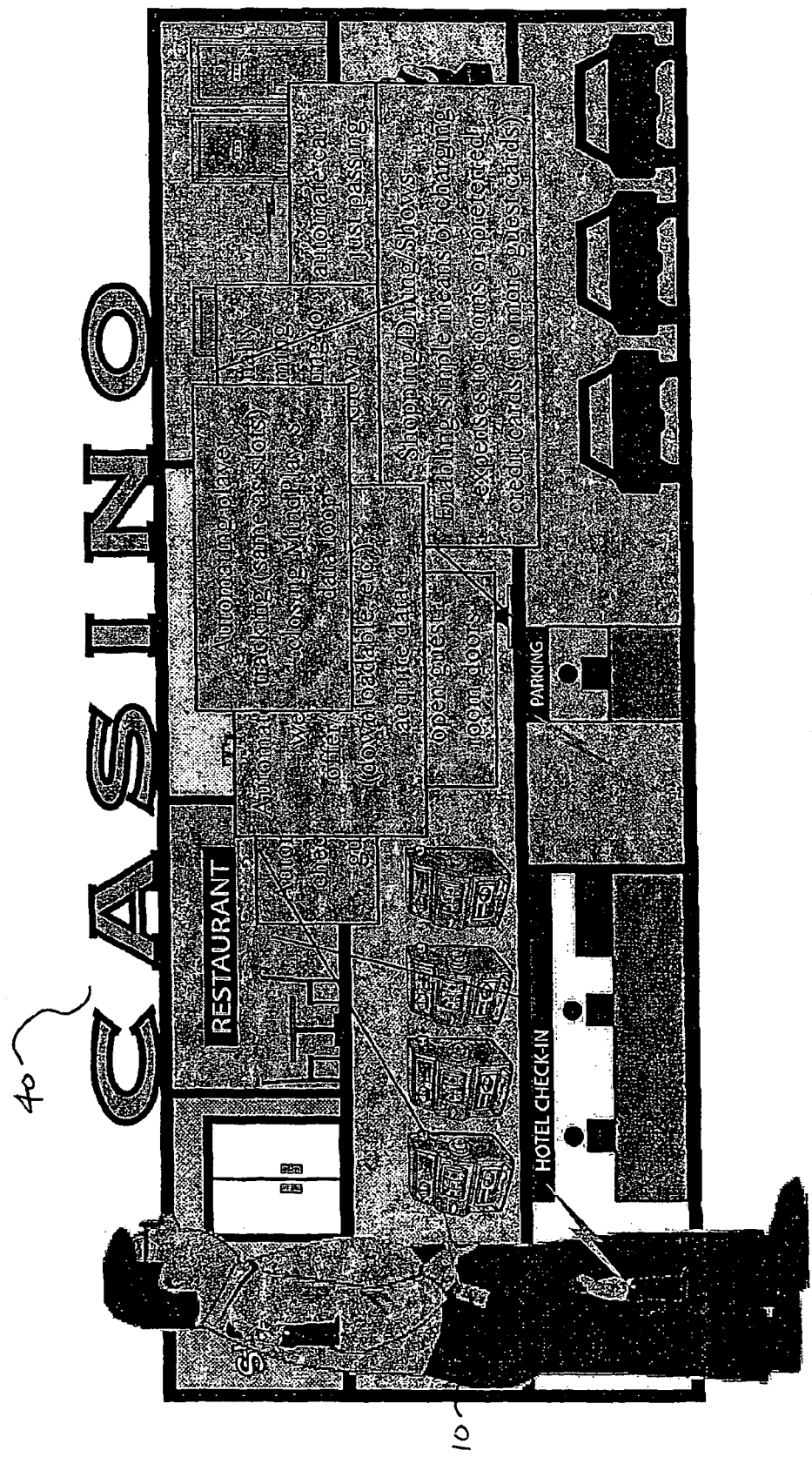
FIG. 14 is an illustration of a person with an associated personal digital key enabling multiple casino customized services relating to restaurant, hotel, and parking through a linked account, in the present invention.
Figure 15:
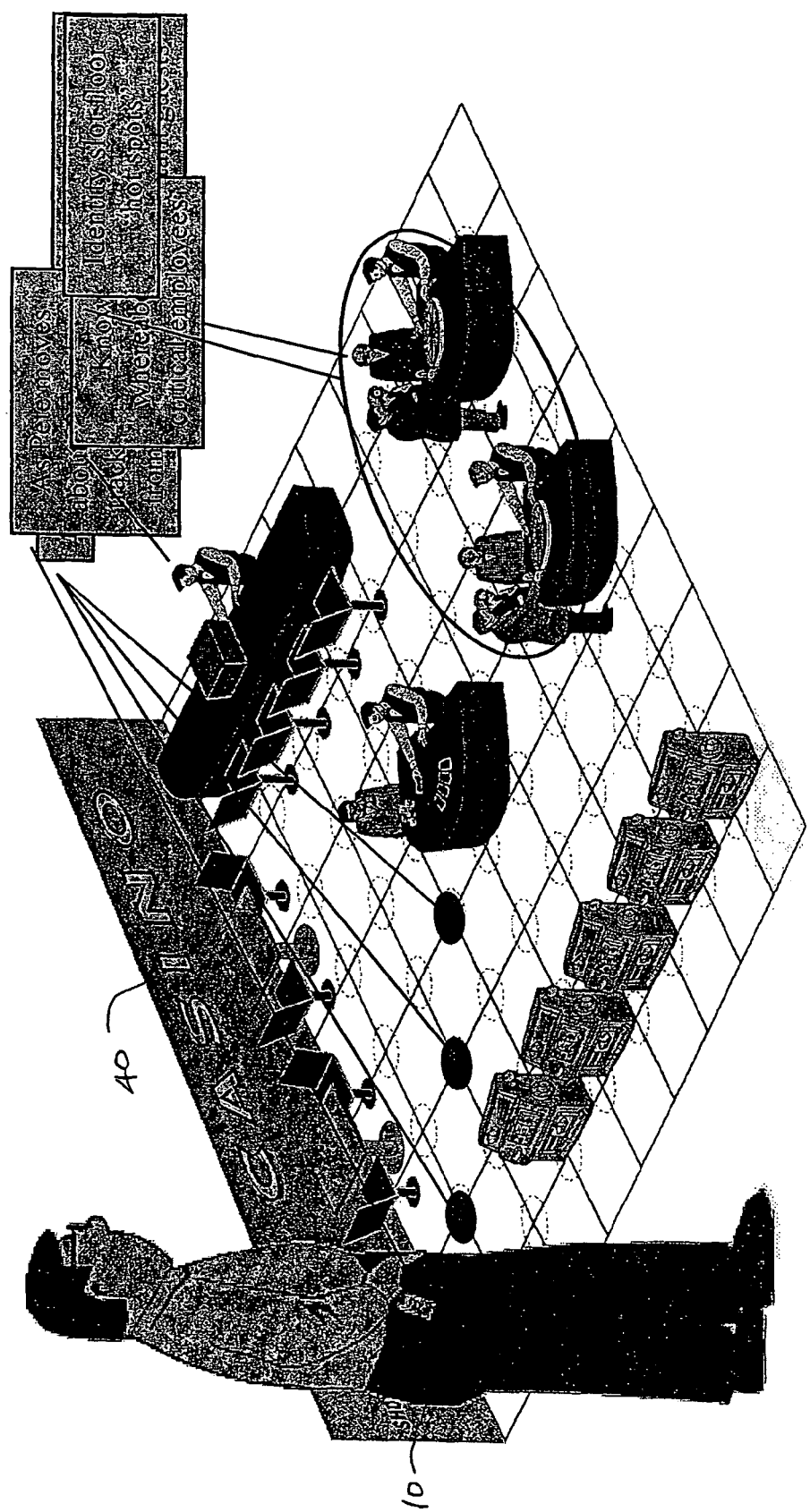
FIG. 15 is an illustration of a person with an associated personal digital key enabling casino customized services relating to the tracking of customers and employees, in the present invention.

The system's features and capabilities, as in FIGS. 14-15, provide casinos 40 and hotels increased profitability by offering their guests a greatly-enhanced, more comfortable and fun experience, while simultaneously enabling a wide array of new marketing and data gathering capabilities. The product can be introduced as a player tracking card (i.e. plastic cards used by players to accumulative redeemable points) replacement, and over time expanded to provide a potentially property-wide solution. The ability to automatically recognize guests (and employees) and use the information to track, market, and collect data creates significant new opportunities for managing and growing casino and hotel operations (e.g. downloadable gaming). Automatic player tracking login offers the potential to significantly increase system utilization, and enhance the customer experience. Data, such as how long a person looked at a new game, but chose not to play, can now be acquired. The system always knows "who's there" and can use the data as needed.

Operators of the system can utilize the technology to provide extremely efficient and personalized guest services, and to implement powerful new employee management options. The system enables a totally passive and comprehensive property management solution, including automatic player tracking, customized downloading, slot floor research reporting, innovative marketing options, and on premise access options. It leverages market and customer interest in technologies, maximizing floor profitability via practical application of superior player tracking and data analysis. It also enables system and device data gathering and analysis abilities to configure floor profitability. The market places growth premiums on technologies providing tangible benefits. The system presents a solution to longer-term applications related to online gaming via biometric extension.

At the discretion of the system's administrators (e.g. a casino property owner), any individual Key can be utilized for on-premise functions of a single casino/hotel property, and/or multiple casino/hotel properties, including properties from unrelated entities. Key usage may be configured as one per individual, one per casino, one per casino chain, or a combination of each depending on needs. On-line/Internet-based functions include on-line gaming and general website interaction—providing identification, authentication, age-verification, and means of payment services. In addition, a Key can also be used for and with any other non-gaming-related system-based application and product. Identical style Keys can be used by customers and employees, simplifying Key operations and management.

RDCs may be installed and utilized independently (e.g. on floors, ceilings, walls), in gaming equipment (e.g. slot machines, table games), or in other equipment/environments (e.g. cash registers, check-in desks, PCs, kiosks). When installed in electronic gaming machines, tables, or similar equipment, RDCs may be connected to the system's network(s) and centralized database(s) via player tracking hardware, in-place of or in addition-to the hardware's card-reader component (via the same connection port), or via local-device's gaming motherboard (bypassing player tracking hardware). RDCs may also be connected via independent hardware connected directly to PTS network (bypassing all local-device hardware), or via independent hardware connected to an independent network running parallel to a PTS network (where the networks may optionally be connected elsewhere). Connections for any of the above options may be wired or wireless.

The system is able to benefit casinos by providing significant data capture and marketing capabilities and opportunities, ability to offer customers effortless and consistent access to casino player Rewards Programs (RP), ability to build and enhance customer-loyalty, ability to offer customers a more capable, simpler, and efficient PTC solution than any currently available option (such as standard PTC or smart cards), and technologies such as retinal-scan and finger-print technologies. The system can also provide lower per-unit gaming machine costs due to the positive price differential between standard card readers and RDCs, and additional available unused gaming machine front-surface space (due to card readers not being installed) providing promotional ad space and more simplified player interface.

The system's general configuration features may include customer database records, local machine hard drives and associated data, and any other transaction/stored data may be linked/associated with Keys taking advantage of PDK's encryption capabilities to enhance data security and integrity. When idle, RDCs look for any Keys remaining within their "read window" for a definable period of time (e.g. to determine whether a player wishes to "log in" to PTS, to measure time players spend browsing, to recognize hotel guests near kiosks). When an RDC detects a Key and has read its data, it presents on its display mechanism (one internal to the local-device) a message showing the player's name (or nickname) and asking for confirmation of the Key's use (on gaming devices this action would effectively log the player into the PTS network for the duration of their game play). RDCs will not look to log someone else in, once someone is already logged in, but they will still be looking for other Keys, even though someone is logged in. The RDCs, in looking for other keys, enable the system for example to track people moving through a casino. When a player (Key) moves out of range, a "bell" (or similar) may sound to catch the player's attention, asking for confirmation to "log out". After a definable amount of time however, it may log the player out automatically.

In the system, to better define a "read window" (a desired Key detection area), RDCs may include options and capabilities including a directional antenna which narrows the "active window" (angular area from which a Key can be detected) to a limited space (e.g. the front area of a gaming device). An adjustable "read range and elasticity" feature (distance from an RDC at which a Key should be detected) to further limit the "active window" and minimize spurious reads, a "strongest signal detection" feature (where the strength of each detected Key signal is compared to determine the strongest) to more accurately select a specific/correct Key when multiple Keys are detected, a "read duration" feature (length of time a Key is "seen" or "not seen" before RDC considers it "detected" or "lost") to minimize spurious reads.

The system has the ability to automatically deliver information to individuals based on their (Key's) proximity to an RDC (and optionally also from information retrieved from the Key's associated account). Examples include customer preference items (default bet information, color or text-size options), and automating downloadable gaming (where games are actually stored and retrieved from centralized servers versus the local gaming devices) customers can be offered games, sets of games/game types, based on their known likings, dynamic casino-floor game configuration. A section of a casino's floor can dynamically be configured for card games, another for slots, etc., based on known histories and preferences of customers and browsers, or specific quantities of customers and browsers in a given section at a given time. Therefore, in one embodiment, one or more slot machines (e.g. a section of a casino floor) may be configured with the same or similar content (e.g. blackjack) based on the linked accounts associated with multiple PDKs (e.g. known histories and preferences of customers and browsers, or specific quantities of customers and browsers in a given section at a given time).

In a downloadable game environment, where games in slot machines can be changed, by taking advantage of all the data that is accumulated from the wireless keys, the system down the line, through a program on the back-end, can reconfigure the floor itself, dynamically changing the floor layout by taking advantage of the downloadable gaming capabilities, and the fact that keys are reporting that type of information. For example, at certain times more people will be playing blackjack games than slot machine games, whereupon the system can change large parts of the floor over to blackjack games from the slot machine games. Additional deliverable information includes customer recognition/greeting—grabbing attention of "browsers" by displaying their name (or nickname), offering incentives to play/shop, offering marketing promos, or similar, and customer marketing promotions—offering prizes to individuals playing particular high-stakes games at the right moment.

The system also has the ability to automatically acquire data from individual's based on their (Key's) proximity to an RDC. Examples include any data available via current/standard PTS devices, player data at non-connected (not directly attached to PTS network) games such as poker tables, blackjack tables, passive-viewer (browser) statistics, tracking how many individuals look at a new game and for how long, and how many passed through a particular section of casino. Also, acquired data may include general customers and browsers statistics, game/game-type/game-bank data, shopping and restaurant preference data, general customers and browsers data—shopping and restaurant sales transactions, and customer and Key identification data, used to trigger hotel room locking mechanisms, to trigger kiosk programs, and to automatically identify customers to parking-garage attendants.

Further, the system enables game/machine and back-end systems configuration and management such as to enable casinos internal management processes including enabling setup, configuration, and reporting features of games, machines, and backend systems, without requiring such equipment to be internally accessed (minimizing how often machines are opened, how long procedures take to perform), as with customers and players, and RDCs can detect authorized casino personnel by the Key(s) they possess, and optionally, a related password for confirmation. All transaction-related information (user ID, changes/modifications performed) can optionally be automatically logged to create an audit trail.

Also, the system enables casino-wide operations, by utilizing RDCs in stand-alone devices, or as components of other available devices. The system can provide centralized, consistently-administered and efficient management of additional casino operations such as hotel check-in/check-out, restaurant/store transactions, hotel room-key replacement, and parking-garage management. Customers and players can automatically, efficiently, and consistently be recognized, addressed, marketed to, tracked and billed anywhere on the property (or property chain). Additionally the system's security features and capabilities can provide safe, centralized EFT system management across a property's operations.

The system further enables Casino and Hotel systems to provide a greatly enhanced player and customer tracking system and experience, by enabling customers and players to automatically, efficiently, and consistently be recognized, addressed, marketed to, observed/researched (optionally at their discretion), tracked and billed anywhere on a property(s). In addition, the system enables centralized, consistently-administered and efficient management of additional property operations such as hotel check-in/check-out, restaurant/store transactions, hotel room-key utilization, and parking-garage management. In addition, any individual PDK Key can be utilized for any and all other defined PDK-related functions/uses.

Other uses of the technology may include customer-convenience features, including automatic logons and log-offs from PTSs, and utilization of Keys (and secured transaction technology) for any cash or room-based transactions occurring on given system(s)/property(s), including properties from unrelated entities. Further features include utilization of a single Key to safely and securely pay for any services on a property(s), open hotel room doors, automatically notify the parking garage cars are to be retrieved, automating hotel check-in/check-out processes, automatically accessing kiosks (for account information), and for any standard PTS-based need. It can also be used for automatic presentation and/or selection of user-specific preferences such as game/bet options, or favorite game/set of games (in a downloadable gaming environment), and favorite wines and dishes at a restaurant.

Marketing acquisition features (automatically acquired from individuals based on their Key's proximity to RDCs) include any data available via current and standard PTS devices, and optionally any other business-related transactions on a property(s), player data at non-connected (not directly attached to PTS network) games, such as poker tables, blackjack tables. It may also acquire passive-viewer (browser) statistics—tracking how many individuals look at a new game (but chose not to play) and for how long, and how many passed through a particular section of casino, "hot spots" within a property. General customers and browsers statistics may be collected including game/game-type and game-bank data, and shopping and restaurant preference data.

Marketing delivery features automatically delivered to individuals based on their Key's proximity to an RDC, utilizing previously-acquired known preferences, include automating downloadable gaming (where games are actually stored and retrieved from centralized servers versus local gaming devices), where customers can be offered games, sets of games/game types, based on their known likings, pre-acquired statistics and/or the property's advertising and marketing needs. Additional features include automatically offering and setting customer preference information (default bet information, color or text-size options), which enhances the customer experience and extends their length of play, automatically locating and/or recognition and greeting customers, including grabbing attention of "browsers" by displaying their name (or nickname), and offering incentives, automatically offering targeted marketing promos, such as offering prizes to individuals playing particular games or at particular times, offering dinners at favorite restaurants or gifts at favorite shops, and third-party products relative to known likings.

Property-management-oriented features include enabling customers and players to automatically, efficiently, and consistently be recognized, addressed, marketed to, observed and researched (optionally at their discretion), tracked and billed anywhere on a property(s), which provides a greatly enhanced player and customer experience. Added features include enabling centralized, consistently-administered and efficient management of additional property operations such as hotel check-in/check-out, restaurant/store transactions, hotel room-key utilization, and parking-garage management.

Other features include providing secure, system-wide, unified-model access to customer-related account information, optionally utilizing a separate pass-phrase (or equivalent) to further increase the level of security, such as for cash balances, EFT functions, game outcome data, user preferences (such as favorite games, and game settings), marketing preferences (favorite restaurants, drinks, and shows), and status information (such as the location of a car in the parking garage, and a hotel room number). Also, further features include dynamically re-configuring casino-floor game layouts (via downloadable gaming technologies), whereby a section of a casino's floor can dynamically be configured for card games, and another for slots, based on known histories and preferences of customers and browsers, and specific quantities of customers and browsers in a given section at a given time.

The system is able to simplify, manage and control employee setup, configuration and reporting features of games, machines, and backend systems. Many of these functions can be accomplished without requiring the equipment to be internally accessed and without mechanical keys (minimizing how often machines are opened, and how long procedures take to perform), automatically detect, locate and track a Key holder's physical position/activity (when in proximity of an associated system), applicable to customers and employees, and automatically control access to digital and physical entities. Additional functions include managing valid time and location access controls, and automatically log and create audit trails of all system-related transaction information (user ID, changes/modifications performed, and transactions completed).

The system provides security-oriented features and products for securing and protecting digital transactions, enabling their use as an electronic payment (EFT) means, for securing digital files, enabling secure access to system and non-system data files (such as a database, Word or Excel, file), and for secure downloading of digital content/data on the system, such as downloadable games or promotional marketing data. The system further provides for securing data on and providing secure access to digital storage devices such as hard drives, customer database records, and individual digital hard drives, digital files, and digital transaction data may be associated and linked with particular Keys, encrypting and securing the content/devices, for enabling customized, gaming-specific, hard drive device intended for direct integration into gaming machines (e.g. a slot machine). The system offers an integrated device RDC and a regulatory agency-approved, secure storage unit (for downloadable/pre-loaded electronic games, game/player tracking system data).

While the particular system as shown and disclosed in detail herein is fully capable of obtaining the objects and providing the aspects and advantages previously stated, it is to be understood that it is merely illustrative of the presently preferred embodiment of the invention, and that no limitations are intended to the details of construction or design shown herein other than as described in the appended claims.

I claim:

1. A system comprising:
a first personal digital key associated with an owner, the personal digital key capturing, at the first personal digital key, biometric information from a first person and authenticating, at the first personal digital key, the first person as the owner of the first personal digital key based at least in part on the captured biometric information, the first personal digital key including an encrypted digital key identifier unique to the first personal digital key for enabling automatic authentication of the first personal digital key and, upon the first personal digital key authenticating the first person as the owner based on the captured biometric information, transmitting that same encrypted digital key identifier without the biometric information; and
an account linking system that performs automatic authentication of the first personal digital key, the account linking system including a receiver or decoder circuit integrated into a first device, the receiver or decoder circuit having a range defining proximity and automatically authenticating the first personal digital key based on the encrypted digital key identifier received responsive to the first personal digital key being in proximity to the receiver or decoder circuit and responsive to the first personal digital key authenticating the first person as the owner, the first personal digital key and the receiver or decoder circuit automatically authenticating each other when in proximity to one, the receiver or decoder circuit detecting an item that is included in a plurality of items that are associated with the first personal digital key in a linked account responsive to authentication, the linked account, tracking the plurality of items associated with the first personal digital key, stored in a central database and the linked account being:

(a) decrypted responsive to the first personal digital key being located in a proximity to the receiver or decoder circuit and the first personal digital key being authenticated by the receiver or decoder circuit, the first personal digital key authenticated by the receiver or decoder circuit subsequent to the first personal digital key authenticating the first person as the owner of the first personal digital key based at least in part on the captured biometric information, and (b) encrypted responsive to the first personal digital key being located out of the proximity to the receiver or decoder circuit, the account linking system accumulating data associated with a plurality of personal digital keys associated with different persons in an area including content received at a second device in use by an owner of a second personal digital key, the plurality of personal digital keys including the first personal digital key and the second personal digital key, determining devices associated with the area including the first device and the second device, determining to provide content similar to the content received at the second device in use by the owner of the second personal digital key to the first device based on satisfaction of a predefined threshold associated with the accumulated data associated with the plurality of personal digital keys in the area and including the content received at the second device in use by an owner of a second personal digital key as well as the linked account, the receiver or decoder circuit including a non-user-modifiable unique identifier associated with the receiver or decoder circuit and different from the encrypted digital key identifier received from the first personal digital key, the non-user-modifiable unique identifier associated with the receiver or decoder circuit used by a server to encrypt the determined content, the determined content received at the first device and sent from the server.

2. A system as in claim 1, wherein the plurality of items includes one or more a secured file, a drive, a door, a computer and a gaming machine.

3. A system as in claim 1, wherein the first personal digital key transmits the unique encrypted digital key identifier to the receiver or decoder circuit through a secure wireless link.

4. A system as in claim 1, wherein the unique encrypted digital key identifier is a non-user-modifiable and non-biometric, and set during manufacture of the first personal digital key.

5. A system as in claim 1, wherein the receiver or decoder circuit is able to detect, authenticate, and securely communicate with the first personal digital key.

6. A system as in claim 1, wherein the linked account includes data therein, and the receiver or decoder circuit is able to access the data in the linked account based upon automatic authentication of the first personal digital key.

7. A system as in claim 1, wherein the range defining proximity to the receiver or decoder circuit to enable account linking is dynamically adjustable after manufacture of the receiver decoder circuit.

8. A system as in claim 1, wherein the system is able to provide a customized service for the linked account.

9. A system as in claim 1, wherein the first personal digital key and receiver or decoder circuit include embedded challenge-response logic and cryptographic algorithms, for enabling authentication of the first personal digital key and the receiver or decoder circuit as original, not copied, authorized devices.

10. A system as in claim 1, wherein the first device is a gaming machine and games are able to be downloaded to the gaming machine, the gaming machine including the receiver or decoder circuit, the linked account tracking preferences through the system regarding games, and, based upon the preferences, and using the receiver or decoder circuit non-user-modifiable and non-biometric unique identifier, the system is able to encrypt and download such games to the gaming machine.

11. A system as in claim 1, wherein the receiver or decoder circuit is able to detect, authenticate, and securely communicate with multiple personal digital keys in parallel.

12. A system as in claim 1, wherein the system includes a network, the network includes one or more servers, which includes the server, and one or more other devices, which includes the first device, wherein, each of the one or more other devices includes the receiver or decoder circuit, and wherein transaction data is able to flow across the network between the one or more servers and the one or more other devices, and the receiver or decoder circuits in the one or more other devices are able to encrypt and decrypt the transaction data so as to protect the transaction data, wherein the transaction data is encrypted between the server and the first device using a first receiver or decoder circuit's non-user-modifiable and non-biometric unique identifier, the first receiver or decoder circuit in the first device.

13. A system as in claim 8, wherein the customized service provided for the linked account is for a casino property.

14. A system as in claim 8, where the customized service provided for the linked account is for a hotel property.

15. A system as in claim 10, wherein the server is a game server and the content includes a game, wherein the system further includes the game server which includes games which the game server is able to encrypt, and wherein the receiver or decoder circuit in the gaming machine is able to accept games from the game server which have been encrypted with the receiver or decoder circuit's unique identifier as the encryption key, and wherein the receiver or decoder circuit is able to decrypt such games for play on the gaming machine.

16. A system as in claim 12, wherein the first device is a gaming machine, the gaming machine including a receiver or decoder circuit that is able to encrypt transaction data delivered to the gaming machine, to be decrypted upon proximity of the first personal digital key to the gaming machine.

17. A system as in claim 13, wherein a casino property customized service comprises tracking a number of personal digital keys which are in proximity to the receiver or decoder circuit.

18. The system as in claim 1, wherein the first device and the second device are physically located in the area, the accumulated data including data regarding a content preference associated with the owner of the first personal digital key, data associated with one or more browsers in the area, and the content received at the second device.

19. The system as in claim 1, wherein the account linking system sends the first device content and additional deliverable information to the first device, wherein the additional deliverable information includes information intended to grab the attention of or entice a browser or the first person to interact with the first device.

20. The system as in claim 19, wherein the additional deliverable information includes one or more of a personalized greeting, an incentive to play, an incentive to shop, a promotion and a prize for playing a particularly high-stakes game.

21. A system as in claim 1, wherein the receiver or decoder circuit's non-user-modifiable unique identifier is used to encrypt and decrypt content.

22. A method comprising:
locating a first personal digital key proximate to a receiver or decoder circuit, the receiver or decoder circuit integrated into a first device and having a range defining proximity;
receiving an encrypted digital key identifier from the first personal digital key upon the first personal digital key authenticating a first person as an owner associated with the first personal digital key based on captured biometric information from a biometric action;
automatically authenticating the first personal digital key based on the encrypted digital key identifier, the encrypted digital key identifier received responsive to the first personal digital key being within proximity of the receiver or decoder circuit and responsive to authenticating the first person as the owner, the first personal digital key and the receiver or decoder circuit automatically authenticating each other based on proximity of the first personal digital key to the receiver or decoder circuit;
associating the first personal digital key with a linked account upon automatic authentication of the first personal digital key, the linked account tracking a plurality of items that are associated with the first personal digital key including a file;
responsive to the first personal digital key being within proximity of the receiver or decoder circuit and the first personal digital key being authenticated by the receiver or decoder circuit, the first personal digital key authenticated by the receiver or decoder circuit subsequent to the first personal digital key authenticating the first person as the owner of the first personal digital key based at least in part on the captured biometric information, granting permission to access the file and granting permission to access the linked account, one or more of the file as well as the linked account stored in a central database;
responsive to the first personal digital key no longer being within the proximity of the receiver or decoder circuit, securing the file and securing the linked account;
accumulating data associated with a plurality of personal digital keys associated with different persons in an area including content received at a second device in use by an owner of a second personal digital key, the plurality of personal digital keys including the first personal digital key and the second personal digital key;
determining devices associated with the area including the first device and the second device;
determining content similar to the content received at the second device in use by the owner of the second personal digital key for the first device based on satisfaction of a predefined threshold associated with the accumulated data associated with the plurality of personal digital keys in the area and including the content received at the second device in use by an owner of a second personal digital key as well as the linked account, the receiver or decoder circuit including a non-user-modifiable unique identifier associated with the receiver or decoder circuit and different from the encrypted digital key identifier received from the first personal digital key, the non-user-modifiable unique identifier associated with the receiver or decoder circuit used by a server to encrypt the determined content; and
receiving the determined content at the first device from the server.

23. A method as in claim 22, wherein the first personal digital key transmits the encrypted digital key identifier to the receiver or decoder circuit through a secure wireless link, and wherein the method further comprises securely wirelessly linking the first personal digital key to the receiver or decoder circuit.

24. A method as in claim 22, wherein the encrypted digital key identifier is a unique and non-user-modifiable and non-biometric identifier set during manufacture of the first personal digital key.

25. A method as in claim 22, wherein the receiver or decoder circuit is able to detect, authenticate, and securely communicate with the first personal digital key, and wherein automatically authenticating in the method further includes detecting, authenticating, and securely communicating with the first personal digital key through the receiver or decoder circuit.

26. A method as in claim 22, wherein the linked account includes data therein, and the receiver or decoder circuit is able to access the data in the linked account based upon automatic authentication of the first personal digital key, and wherein the method further comprises accessing the data in the linked account through the receiver or decoder circuit upon automatic authentication of the first personal digital key.

27. A method as in claim 22, wherein the range defining proximity to the receiver or decoder circuit to enable account linking, is dynamically adjustable after manufacture of the receiver decoder circuit, and wherein the method further comprises adjusting the range.

28. A method as in claim 22, wherein the method further includes providing one or more customized services for the linked account.

29. A method as in claim 22, wherein the first personal digital key and receiver or decoder circuit includes embedded challenge-response logic and cryptographic algorithms, for enabling authentication of the first personal digital key and the receiver or decoder circuit as original, not copied, authorized devices, and wherein the method further comprises authenticating the first personal digital key and the receiver or decoder circuit as original, not copied, authorize devices.

30. A method as in claim 22, wherein the first device is a gaming machine and games are able to be downloaded to the gaming machine, the gaming machine including the receiver or decoder circuit, the linked account tracking preferences regarding games, and, based upon the preferences, and using the receiver or decoder circuit's non-user-modifiable and non-biometric unique identifier, encrypting such games and downloading such games to the gaming machine.

31. A method as in claim 22, wherein the receiver or decoder circuit is able to detect, authenticate, and securely communicate with multiple personal digital keys in parallel, and wherein the method further comprises the receiver or decoder circuit to detecting, authenticating, and securely communicating with multiple personal digital keys in parallel.

32. A method as in claim 22, wherein a network includes one or more servers, which includes the server, and one or more other devices, which includes the first device, wherein each of the one or more other devices includes a receiver or decoder circuit, and wherein transaction data is able to flow across the network between the one or more servers and the one or more other devices with their associated receiver or decoder circuits, and the receiver or decoder circuits in the one or more other devices are able to encrypt and decrypt the transaction data so as to protect the transaction data, and wherein the method further comprises protecting the transaction data by encryption thereof through the receiver or decoder circuits.

33. A method as in claim 28, wherein at least one customized service from the one or more customized services provided for the linked account is for a casino property, and wherein the method further comprises providing the customized service for the casino property.

34. A method as in claim 28, wherein at least one customized service from the one or more customized services provided for the linked account is for a hotel property, and wherein the method further comprises providing the customized service for the hotel property.

35. A method as in claim 30, wherein the server is a game server and the content includes a game, wherein the game server includes games which the game server is able to encrypt, and wherein the receiver or decoder circuit in the gaming machine is able to accept games from the game server which have been encrypted with the receiver or decoder circuit's unique identifier as the encryption key, and wherein the receiver or decoder circuit is able to decrypt such games for play on the gaming machine, and wherein the method further comprises decrypting games for play on the gaming machine through the receiver or decoder circuit.

36. A method as in claim 32, wherein the first device is a gaming machine and the receiver or decoder circuit in the gaming machine is able to encrypt the transaction data delivered to the gaming machine, to be decrypted upon proximity of the first personal digital key to the gaming machine, and wherein the method further comprises decrypting the transaction data upon proximity of the first personal digital key to the gaming machine.

37. A method as in claim 33, wherein the customized service for the casino property comprises tracking a number of personal digital keys which are in proximity to a receiver or decoder circuit, and wherein the method further comprises tracking the number of personal digital keys which are in proximity to a receiver or decoder circuit.

38. The method as in claim 22, wherein the first device and the second device are physically located in the area, the accumulated data including data regarding a content preference associated with the owner of the first personal digital key, data associated with one or more browsers in the section, and the content received at the second device.

39. The method as in claim 38, wherein the account linking system sends the first device content and additional deliverable information to the first device, wherein the additional deliverable information includes information intended to grab the attention of or entice a browser or the first person to interact with the second device.

40. A method as in claim 22, wherein the first personal digital key capturing the biometric information comprises capturing a fingerprint or an eye scan.

41. A method as in claim 22 further comprising:
encrypting and decrypting, using the receiver or decoder circuit, content based at least in part on the non-user-modifiable and non-biometric unique identifier.

42. A system comprising:
a first personal digital key that includes a computer readable storage medium for storing an encrypted digital key identifier unique to the first personal digital key for enabling automatic authentication of the first personal digital key, the first personal digital key capturing, at the first personal digital key, biometric information from a first person and authenticating, at the first personal digital key, the first person as an owner of the first personal digital key based at least in part on the captured biometric information, and upon the first personal digital key authenticating the first person as the owner based on the captured biometric information, transmitting that same encrypted digital key identifier without the biometric information; and
a receiver or decoder circuit, associated with a first device, the receiver or decoder circuit having a range defining proximity and automatically authenticating the first personal digital key based on the encrypted digital key identifier received responsive to the first personal digital key being within a proximity of the receiver or decoder circuit and responsive to the first personal digital key authenticating the first person as the owner, the first personal digital key and the receiver or decoder circuit automatically authenticating each other based on proximity of the first personal digital key to the receiver or decoder circuit, the receiver or decoder circuit detecting an item that is included in a plurality of items that are associated with the first personal digital key responsive to authentication, a linked account, which tracks the plurality of items associated with the first personal digital key, stored in a central database and the linked account being:
(a) accessible responsive to the first personal digital key being located in a proximity to the receiver or decoder circuit and the first personal digital key being authenticated by the receiver or decoder circuit, the first personal digital key authenticated by the receiver or decoder circuit subsequent to the first personal digital key authenticating the first person as the owner of the first personal digital key based at least in part on the captured biometric information, and
(b) secured responsive to the first personal digital key being located out of the proximity to the receiver or decoder circuit,
the receiver or decoder circuit accumulating data associated with a plurality of personal digital keys associated with different persons in an area including content received at a second device in use by an owner of a second personal digital key, the plurality of personal digital keys including the first personal digital key and the second personal digital key, determining devices associated with the area including the first device and the second device, performing a determination of content for the first device similar to content received at the second device in use by the owner of the second personal digital key based on satisfaction of a predefined threshold associated with accumulated data associated with the plurality of personal digital keys in the area and including the content received at the second device in use by the owner of the second personal digital key as well as the linked account, the receiver or decoder circuit including a non-user-modifiable unique identifier associated with the receiver or decoder circuit and different from the encrypted digital key identifier received from the first personal digital key, the non-user-modifiable unique identifier associated with the receiver or decoder circuit used by a server to encrypt the determined content, the determined content received at the first device from the server.

43. A system as in claim 42, wherein the first personal digital key is a tangible object, capable of wireless communication with the receiver or decoder circuit.

44. A system as in claim 42, wherein the first device is a computer with a computer hard drive, wherein the receiver or decoder circuit is located in the computer hard drive.

45. A system as in claim 42, wherein the first device is a computer, wherein the receiver or decoder circuit is integrated with the computer.

46. A system as in claim 42, wherein the first device is a computer, wherein the computer further includes a receiver or decoder circuit card.

47. A system as in claim 42, wherein the first device is a computer including the receiver or decoder circuit, and the central database includes an account identifier and a personal digital key identifier.

48. A system as in claim 47, wherein the first personal digital key transmits a unique identifier to the computer's receiver or decoder circuit that is authenticated by the computer's receiver or decoder circuit utilizing first personal digital key data stored in the central database.

49. A method comprising:
providing a tangible, first personal digital key to a user, wherein the first personal digital key contains unique identifier information that is used by a receiver or decoder circuit as a cryptographic key, enabling the receiver or decoder circuit to associate media with the first personal digital key and encrypt and decrypt a computer readable media as needed, the first personal digital key performing a biometric action to authenticate the user as an owner;
authenticating the user as the owner and associated first personal digital key responsive to the information relayed from the first personal digital key matching identification data previously provided or stored on a linked account and responsive to the first personal digital key being within a proximity of an account linking system and responsive to the biometric action taken by the first personal digital key authenticating the user as the owner, wherein the information relayed lacks biometric information, wherein the identification data includes identification of the media, and wherein the biometric action comprises capturing, at the first personal digital key, the biometric information from the user and authenticating, at the first personal digital key, the user as the owner based at least in part on the captured biometric information;
responsive to authenticating the user as the owner and the associated first personal digital key and the first personal digital key being within the proximity of the account linking system, granting permission to access the media and the linked account, the linked account stored in a central database; and
responsive to the first personal digital key no longer being within the proximity of an account linking system, securing the media and securing the linked account, the linked account stored in a central database,
wherein the first personal digital key and the receiver or decoder circuit authenticate each other based on proximity of the first personal digital key to the receiver decoder circuit;
accumulating data associated with a plurality of personal digital keys associated with different persons in an area including content received at a second device in use by an owner of a second personal digital key, the plurality of personal digital keys including the first personal digital key and the second personal digital key;
determining devices associated with the area including the first device and the second device;
determining content for a first device associated with the receiver or decoder circuit that is similar to the content received at the second device in use by the owner of the second personal digital key based on satisfaction of a predefined threshold associated with the accumulated data associated with the plurality of personal digital keys in the area and including the content received at the second device in use by an owner of a second personal digital key as well as the linked account, the receiver or decoder circuit including a non-user-modifiable unique identifier associated with the receiver or decoder circuit and different from an encrypted digital key identifier received from the first personal digital key, the non-user-modifiable unique identifier associated with the receiver or decoder circuit used by a server to encrypt the determined content; and
receiving the determined content at the first device from the server.

50. A method as in claim 49, wherein the linked account includes account information and further comprising responsive to purchasing an item from a seller with a credit card and detecting a presence of the first personal digital key, transmitting the account information to the seller.

51. A method as in claim 49, further comprising the first personal digital key transmitting the unique information through a secure wireless link.

* * * * *